United States Patent [19]

Lane et al.

[11] 4,283,298

[45] Aug. 11, 1981

[54] HYDRATED MG(NO₃)₂/NH₄NO₃ REVERSIBLE PHASE CHANGE COMPOSITIONS

[75] Inventors: George A. Lane; Harold E. Rossow, both of Midland, Mich.

[73] Assignee: The Dow Chemical Company, Midland, Mich.

[21] Appl. No.: 90,729

[22] Filed: Nov. 2, 1979

[51] Int. Cl.³ .............................................. C09K 5/06
[52] U.S. Cl. .................................... 252/70; 126/400; 165/DIG. 4; 165/104.17
[58] Field of Search .................... 126/400; 165/104 S, 165/104 M, DIG. 4, 17; 252/67, 70

[56] References Cited

U.S. PATENT DOCUMENTS

| | | | |
|---|---|---|---|
| 2,677,664 | 5/1954 | Telkes | 252/70 |
| 2,706,716 | 4/1955 | Howe et al. | 252/70 |
| 2,856,506 | 10/1958 | Telkes | 219/39 |
| 3,536,059 | 10/1970 | Hearst | 126/204 |
| 3,973,552 | 8/1976 | Ervin | 126/271 |
| 4,003,426 | 1/1977 | Best et al. | 165/53 |
| 4,109,702 | 8/1978 | Greene | 165/1 |
| 4,117,882 | 10/1978 | Shurcliff | 165/104 S |

FOREIGN PATENT DOCUMENTS

| | | |
|---|---|---|
| 2550106 | 5/1976 | Fed. Rep. of Germany . |
| 2396061 | 1/1979 | France . |
| 50-90585 | 7/1975 | Japan . |
| 51-43387 | 4/1976 | Japan . |
| 51-70193 | 6/1976 | Japan . |
| 51-76183 | 7/1976 | Japan . |
| 51-126980 | 11/1976 | Japan . |
| 53-19183 | 2/1978 | Japan . |
| 53-14785 | 5/1978 | Japan ......................................... 252/70 |
| 53-70989 | 6/1978 | Japan . |
| 2001096 | 1/1979 | United Kingdom . |
| 568669 | 9/1977 | U.S.S.R. . |

OTHER PUBLICATIONS

Ca 87:70385z; Ca 86:19534z.
Yoneda et al., "Eutectic Mixtures for Solar Heat Storage," *Solar Energy*, vol. 21, pp. 61–63, 1978.
Public Disclosure, NSF/RANN Contract No. NSF-C906.

*Primary Examiner*—P. E. Willis, Jr.

[57] ABSTRACT

A reversible liquid solid phase change composition comprising $Mg(NO_3)_2 \cdot 6H_2O/NH_4NO_3$, and one of the group of MgO, CaO, $Mg(OH)_2$, and/or $Ca(OH)_2$, added to the composition in an effective amount to suppress supercooling of the $Mg(NO_3)_2 \cdot 6H_2O/NH_4NO_3$ liquid phase.

13 Claims, No Drawings

HYDRATED MG(NO₃)₂/NH₄NO₃ REVERSIBLE PHASE CHANGE COMPOSITIONS

FIELD OF THE INVENTION

The invention relates to reversible liquid/solid phase change compositions. More particularly, the invention relates to $Mg(NO_3)_2 \cdot 6H_2O/NH_4NO_3$ phase change compositions containing additives to modify the supercooling properties of the $Mg(NO_3)_2 \cdot 6H_2O/NH_4NO_3$ liquid phase.

BACKGROUND OF THE INVENTION $Mg(NO_3)_2 \cdot 6H_2O/NH_4NO_3$ forms a eutectic mixture which phase changes at about 52° C. (126° F.) releasing or alternately absorbing a substantial quantity of latent heat of fusion. Such properties make the material an excellent choice as a heat storage medium for use in solar energy space heating applications. In order to improve the material for such uses, however, there exists a need to develop additives or a series of additives to suppress the inherent supercooling properties of the $Mg(NO_3)_2 \cdot 6H_2O/NH_4NO_3$ liquid phase, and particularly additives which are highly effective in small amounts.

TERMS

"Hydrated $Mg(NO_3)_2/NH_4NO_3$" means aqueous based, reversible liquid/solid phase change compositions, which exclusive of any additives or impurities, contain in admixture from about 60 to 63 weight percent hydrated $Mg(NO_3)_2$ of principally $Mg(NO_3)_2 \cdot 6H_2O$, and the balance $NH_4NO_3$ (to 100 weight percent). The preferred composition is a hydrate mixture having a melt/freeze temperature of about 52° C. (126° F.) and which contain about 61.5 weight percent $Mg(NO_3)_2 \cdot 6H_2O$, 38.5 weight percent $NH_4NO_3$.

"Supercooling" refers to a generally inherent discrepancy between the temperature at which freezing initiates and the thawing temperature of a given hydrated $Mg(NO_3)_2/NH_4NO_3$ composition, when cooled and heated under quiet conditions.

"Additive(s)" includes, in addition to the nucleating additives specified herein, precursors of such additives nondetrimental to the purpose of the invention.

THE INVENTION

The invention is the discovery of a new class of highly active nucleating additives for hydrated $Mg(NO_3)_2/NH_4NO_3$ compositions. The invention more particularly is a composition comprising hydrated $Mg(NO_3)_2/NH_4NO_3$ and which includes as a nucleating additive to such composition, one or more of the group of MgO, CaO, $Mg(OH)_2$, and $Ca(OH)_2$ added in an amount effective to suppress the supercooling properties of the hydrated $Mg(NO_3)_2/NH_4NO_3$ liquid phase. Sufficient of the additive(s) is present in the preferred practice of the invention to suppress supercooling to no greater than about 2° C. taken on an averaging basis over repeated cycles.

The effective amount of the additive is determined by testing a given composition over repetitive phase change cycles. A given nucleating additive, if present in an insufficient amount may, for example, exhibit only temporary effectiveness. Such behavior is overcome by adding slightly greater amounts of that given additive.

The compositions hereof are ideally packaged in individual encapsulating means for use in conjunction with solar heating systems. Exemplary of suitable and known encapsulating means for the heat storage compositions hereof are water impervious foils of plastic/metal laminates. Also, closed cell plastic foams have been suggested in which the heat storage composition may be encapsulated within the cells of the foam structure, as illustrated, for example, in U.S. Pat. No. 4,003,426, incorporated herein by reference. Yet other useful encapsulating means are metal or plastic cans, such as inexpensive aerosol cans; metal or plastic pipe, such as extruded polyethylene pipe; and the like. Further details respecting such encapsulating means are given in Report Nos. ORO/5217-8 and NSF RANN SE C906 FR 76 1, both available from the National Technical Information Service, Springfield, Virginia, and fully incorporated herein by reference.

EXAMPLE

The data of the Table below are generated by preparing hydrated $Mg(NO_3)_2/NH_4NO_3$ samples according to the ratios indicated, and wherein the mixed samples of each specified ratio are placed into a two-ounce glass vial, which is then heated to greater than 70° C. under agitation to achieve a uniform dispersion or admixture. A glass-encased thermocouple is inserted through the cap of each vial to measure temperature changes at the center of each sample prior to, during and after freezing. The cooling temperature is controlled and maintained within the range of about 20° C.–25° C. (room temperature). Sample No. 16, below, is a control sample, whereas Sample Nos. 7–15 are comparative examples outside the scope of the invention.

TABLE

| Sample | | Additive | | No. of Tests | Supercooling Ave., °C. |
|---|---|---|---|---|---|
| | | Material | wt. % | | |
| 1 | 28.44g Mg(NO₃)₂ + 30.80g NH₄NO₃ + 20.76g H₂O | Mg(OH)₂ | 0.1 | 6 | 6.8 |
| 2 | 28.44g Mg(NO₃)₂ + 30.80g NH₄NO₃ + 20.76g H₂O | " | 0.5 | 132 | 1.3 |
| 3 | 28.44g Mg(NO₃)₂ + 30.80g NH₄NO₃ + 20.76g H₂O | MgO | 0.1 | 131 | 1.8 |
| 4 | 28.44g Mg(NO₃)₂ + 30.80g NH₄NO₃ + 20.76g H₂O | Ca(OH)₂ | 0.1 | 3 | 4.0 |
| 5 | 28.44g Mg(NO₃)₂ + 30.80g NH₄NO₃ + 20.76g H₂O | " | 0.5 | 113 | 1.7 |
| 6 | 28.44g Mg(NO₃)₂ + 30.80g NH₄NO₃ + 20.76g H₂O | CaO | 0.1 | 40 | 2.8 |
| 7 | 28.44g Mg(NO₃)₂ + 30.80g NH₄NO₃ + 20.76g H₂O | CaSO₄ | 0.5 | 5 | 4.8 |
| 8 | 28.44g Mg(NO₃)₂ + 30.80g NH₄NO₃ + 20.76g H₂O | Sr(OH)₂ | 0.1 | 3 | 4.3 |
| 9 | 28.44g Mg(NO₃)₂ + 30.80g NH₄NO₃ + 20.76g H₂O | " | 0.5 | 5 | 5.2 |
| 10 | 28.44g Mg(NO₃)₂ + 30.80g NH₄NO₃ + 20.76g H₂O | SrCO₃ | 0.5 | 5 | 2.8 |
| 11 | 28.44g Mg(NO₃)₂ + 30.80g NH₄NO₃ + 20.76g H₂O | Ba(OH)₂ | 0.1 | 2 | 6.0 |
| 12 | 28.44g Mg(NO₃)₂ + 30.80g NH₄NO₃ + 20.76g H₂O | " | 0.5 | 3 | 4.0 |
| 13 | 28.44g Mg(NO₃)₂ + 30.80g NH₄NO₃ + | BaO | 0.5 | 4 | 2.8 |

TABLE-continued

| Sample | | Additive Material | wt. % | No. of Tests | Super-cooling Ave., °C. |
|---|---|---|---|---|---|
| 14 | 20.76g H$_2$O 28.44g Mg(NO$_3$)$_2$ + 30.80g NH$_4$NO$_3$ + | CuSO$_4$ | 0.5 | 5 | 5.9 |
| 15 | 20.76g H$_2$O 28.44g Mg(NO$_3$)$_2$ + 30.80g NH$_4$NO$_3$ + | ZnSO$_4$ | 0.5 | 5 | 5.6 |
| 16 | 20.76g H$_2$O 28.44g Mg(NO$_3$)$_2$ + 30.80g NH$_4$NO$_3$ + 20.76g H$_2$O | None | — | 3 | 8.3 |

It is understood that other nucleating additives than claimed herein and particularly the less effective additives of the comparative examples (Sample Nos. 7–15) may be used in conjunction with the highly active additives of the invention to prepare improved Mg(NO$_3$)$_2$.6H$_2$O/NH$_4$NO$_3$ phase change compositions. While the data also illustrate that very little of the highly effective species of additives produce marked benefits, such additives may be incorporated in larger amounts, but preferably would not exceed the amount of about 2.0 weight percent of the weight of the phase change composition.

What is claimed is:

1. A reversible liquid/solid phase change composition comprising hydrated Mg(NO$_3$)$_2$/NH$_4$NO$_3$, and as a nucleator, one or more of MgO, CaO, Mg(OH)$_2$, or Ca(OH)$_2$, added to the composition in an amount effective to suppress average supercooling of the hydrated Mg(NO$_3$)$_2$/NH$_4$NO$_3$ liquid phase to about 2° C. or less.

2. The composition of claim 1, wherein the hydrated Mg(NO$_3$)$_2$/NH$_4$NO$_3$ contains about 61.5 weight percent Mg(NO$_3$)$_2$.6H$_2$O and 38.5 weight percent NH$_4$NO$_3$.

3. The composition of claim 1 hermetically contained within encapsulating means.

4. The composition of claim 1 wherein the additive comprises not greater than about 2.0 weight percent MgO.

5. The composition of claim 1 wherein the additive comprises not greater than about 2.0 weight percent CaO.

6. The composition of claim 1 wherein the additive comprises not greater than about 2.0 weight percent Mg(OH)$_2$.

7. The composition of claim 1 wherein the additive comprises not greater than about 2.0 weight percent Ca(OH)$_2$.

8. A method of preparing a hydrated Mg(NO$_3$)$_2$/NH$_4$NO$_3$ liquid/solid phase change composition of suppressed supercooling properties, comprising admixing uniformly in such composition, one or more of MgO, CaO, Mg(OH)$_2$, or Ca(OH)$_2$, in an amount effective to suppress average supercooling of the hydrated Mg(NO$_3$)$_2$/NH$_4$NO$_3$ liquid phase to about 2° C. or less.

9. The method of claim 8, wherein the hydrated mg(NO$_3$)$_2$/NH$_4$NO$_3$ is prepared from a mixture of about 61.5 weight percent Mg(NO$_3$)$_2$.6H$_2$O and 38.5 weight percent NH$_4$NO$_3$.

10. The method of claim 8 using the additive MgO.

11. The method of claim 8 using the additive CaO.

12. The method of claim 8 using the additive Mg(OH)$_2$.

13. The method of claim 8 using the additive Ca(OH)$_2$.

* * * * *